(12) United States Patent
Hama (10) Patent No.: US 7,195,286 B2
(45) Date of Patent: Mar. 27, 2007

(54) TUBE JOINT

(75) Inventor: Tomio Hama, Okaya (JP)

(73) Assignee: Yugen Kaisha Hama International, Okaya (JP)

( * ) Notice: Subject to any disclaimer, the term of this patent is extended or adjusted under 35 U.S.C. 154(b) by 32 days.

(21) Appl. No.: 10/990,447

(22) Filed: Nov. 18, 2004

(65) Prior Publication Data

US 2005/0110275 A1 May 26, 2005

(30) Foreign Application Priority Data

Nov. 21, 2003 (JP) ............................. 2003-392621
Aug. 4, 2004 (JP) ............................. 2004-227398

(51) Int. Cl.
*F16L 37/26* (2006.01)
*F16L 37/18* (2006.01)

(52) U.S. Cl. ...................... 285/322; 285/316; 285/307

(58) Field of Classification Search ................ 285/243, 285/322, 323, 307, 24, 315, 316
See application file for complete search history.

(56) References Cited

U.S. PATENT DOCUMENTS

| | | | |
|---|---|---|---|
| 2,784,987 A * | 3/1957 | Corcoran ...................... 285/82 |
| 3,724,882 A * | 4/1973 | Dehar ......................... 285/243 |
| 3,884,513 A * | 5/1975 | Gassert ....................... 285/322 |
| 4,049,297 A * | 9/1977 | Reneau ......................... 285/24 |
| 4,902,045 A * | 2/1990 | McGugan et al. ............. 285/24 |
| 4,993,755 A * | 2/1991 | Johnston ..................... 285/315 |
| 5,181,751 A * | 1/1993 | Kitamura ...................... 285/39 |
| 5,284,369 A * | 2/1994 | Kitamura ..................... 285/322 |
| 5,468,027 A * | 11/1995 | Guest ......................... 285/319 |
| 5,553,901 A * | 9/1996 | Serot ......................... 285/340 |
| 5,653,480 A * | 8/1997 | Mine et al. .................. 285/322 |
| 5,775,742 A * | 7/1998 | Guest ......................... 285/323 |
| 5,788,290 A * | 8/1998 | Meisinger ................... 285/316 |
| 5,797,626 A * | 8/1998 | Ruggero ........................ 285/5 |
| RE38,786 E * | 8/2005 | Guest .......................... 285/24 |
| 7,032,932 B2 * | 4/2006 | Guest .......................... 285/92 |

FOREIGN PATENT DOCUMENTS

FR 2824618 A1 11/2002
JP 2002-106772 A 4/2002

* cited by examiner

*Primary Examiner*—James M. Hewitt
(74) *Attorney, Agent, or Firm*—Birch, Stewart, Kolasch & Birch, LLP (57) ABSTRACT

A tube can be easily attached to and detached from the tube joint by one hand. The tube joint comprises: a body proper having one open end, from which the tube is inserted; and a locking member locking the tube in the body proper. The locking member includes: a ring section sliding on an inner face of the body proper and moving in an axial direction; a plurality of flexible extended sections extended from the ring section toward the one open end of the body proper; and a plurality of claw sections radially projected inward from front ends of the flexible extended sections. The body proper has a tapered section, which reduces a diameter of the front ends of the flexible extended sections when the locking member is moved toward the one open end and the front ends of the flexible extended sections enter the tapered section, whereby the claw sections bite and lock the tube.

11 Claims, 8 Drawing Sheets

TUBE JOINT

BACKGROUND OF THE INVENTION

The present invention relates to a tube joint, more precisely relates to a tube joint including a cylindrical body proper, into which a tube is inserted from one open end, and a locking member for locking the tube in the body proper.

One of conventional tube joints is disclosed in Japanese Patent Gazette No. 2002-106772. The disclosed tube joint comprises: a pipe-shaped body proper; a guide cylinder, whose one end is press-fitted in the body proper; a stopper fixed in one end part of the guide cylinder; a release ring, which is provided on the one end side of the guide cylinder and capable of moving in the axial direction thereof; a seal ring; and locking claws. The tube joint is connected to a joint hole of a fluidic device.

A tube to be connected is inserted into a tube inlet of the tube joint, which is constituted by the release ring and the guide cylinder. By inserting the tube, the claws are radially moved outward, and the claws contact an outer circumferential face of the tube. In this state, the tube is pulled outward, so that tips of the claws bite the outer circumferential face of the tube. Therefore, the tube can be tightly locked in the tube joint. When the tube is pulled out from the tube joint, the tube is once pushed inward so as to release the tube from the bite of the claws.

In many fluidic devices, a plurality of joint holes are formed, so that tube joints are concentrated in a small area or provided to places where it is difficult to see and deal.

In the tube joint disclosed in the Japanese Gazette, when the tube is pulled out from the tube joint, it is difficult to handle the tube joint. Namely, the release ring should be pushed inward, simultaneously the tube should be pulled outward. A worker must simultaneously handle the tube and the tube joint by his both hands. Therefore, it is difficult for inexperienced workers to attach and detach tubes.

Especially, in the cases that tube joints are concentrated in a small area and provided in a place where it is difficult to see and deal, it is further difficult to handle tubes and the tube joints.

SUMMARY OF THE INVENTION

An object of the present invention is to provide a tube joint which can be easily handled.

To achieve the object, the present invention has following structures.

Namely, the tube joint of the present invention comprises:

a body proper being formed into a cylindrical shape, the body proper having one open end, from which a tube is inserted; and a locking member being provided in the body proper, the locking member locking the tube in the body proper, wherein the locking member includes:

a ring section having an outer circumferential part sliding on an inner circumferential face of the body proper and being capable of moving in an axial direction of the body proper;

a plurality of flexible extended sections being extended from the ring section toward the one open end of the body proper; and a plurality of claw sections being respectively formed at front ends of the flexible extended sections and radially projected inward therefrom, and the body proper has a tapered section, whose inner diameter is gradually reduced toward the one open end and which reduces a diameter of the front ends of the flexible extended sections when the locking member is moved toward the one open end and the front ends of the flexible extended sections enter the tapered section, whereby the claw sections bite and lock the tube.

With this structure, the tube can be easily locked in the tube joint by inserting the tube into the one open end of the body proper and pulling the tube outward. Namely, by inserting the tube, the claw sections contact an outer circumferential face of the tube. Then, by pulling the tube outward, the front ends of the flexible extended sections are moved into the tapered section, so that the diameter of the front ends are reduced and the claw sections tightly bite the outer circumferential face of the tube. Therefore, the tube can be securely locked in the tube joint. Further, the tube can be easily attached to and detached from the tube joint by one hand.

In the tube joint, an inner diameter of the open end of the body proper may be equal to the minimum inner diameter of the tapered section. With this structure, when the tube is attached to the tube joint, by pulling the tube until the front ends of the flexible extended sections of the locking member reach a place on the one open end side with respect to the tapered section, the front ends are not located on a tapered face of the tapered section. Therefore, the front ends never move toward an inner part of the body proper, and the tube can be securely locked.

In the tube joint, the front ends of the flexible extended sections, which are located on the inner side with respect to the tapered section, may be turned in the circumferential direction when an external force for turning the front ends is applied, and returned to initial positions by elasticity of the locking member when the external force disappears, and an engaging mechanism may allow the front ends of the flexible extended sections to enter the tapered section when the front ends are located at the initial positions, and may engage with the front ends so as not to enter the tapered section when the front ends are turned in the circumferential direction. With this structure, when the tube is detached from the tube joint, the tube can be easily pulled out by pushing the tube inward, turning the tube in the circumferential direction and pulling the tube outward. By pushing the tube inward, the front ends of the flexible extended sections are moved inward from the tapered section so as to increase the diameter of the front ends. Next, by turning the tube in the circumferential direction, the front ends are turned in the same direction together with the claw sections biting the tube. Further, by pulling the tube outward, the front ends are engaged with the engaging mechanism and prohibited to move outward, so that only the tube can be detached from the tube joint.

In the tube joint, he engaging mechanism may include: a plurality of projected sections being respectively projected from the flexible extended sections toward the inner circumferential face of the body proper;

a plurality of first groove sections being formed in the inner circumferential face of the body proper and extended in the direction in the axial direction of the body proper, the first groove sections allow the front ends to enter the tapered section without interference with the projections when the front ends are located at initial positions; and a concave section being formed in the inner circumferential face of the body proper, being extended in the circumferential direction thereof, communicating to the first groove sections, and allowing the front ends to turn in the circumferential direction without interference with the projections, and the projections may engage with an edge of the concave section, which is located on the one open end side, so as to prohibit the front ends to enter the tapered section when the front ends are turned. With this structure, the engaging mechanism can have the simple constitution constituted by the projected sections, the first groove sections and the concave section.

In the tube joint, a contact face of the edge of the concave section, which contacts the projection, may be a slope face, in which a distance from the one open end is gradually made shorter toward an inner bottom of the concave section. With this structure, by pulling the tube outward, the projected sections contact the edge of the concave section. Therefore, a force heading the inner bottom face of the concave section is applied to the slope face, so that the diameter of the front ends is increased; the claw sections release the tube, and the tube can be easily pulled off from the tube joint.

In the tube joint, the locking member may have a plurality of arm sections extended from the ring section in the axial direction of the body proper, a plurality of second groove sections may be formed in the inner circumferential face of the body proper, and front ends of the arm sections may be respectively fitted in the second groove sections so that the front ends of the arm sections are prohibited to turn in the circumferential direction of the body proper but allowed to move in the axial direction thereof. With this structure, when the turn of the front ends of the arm sections are prohibited and elasticity of the arm sections and/or the extended sections are applied to turn the front ends of the extended sections, the front ends of the extended sections can turn in the circumferential direction of the body proper; when the front ends of the extended sections are released from the elasticity, they can return to initial positions.

The tube joint may further comprise a biasing member outwardly biasing the locking member toward the one open end. By employing the biasing member, a return action of the locking member can be prevented. Namely, the front ends of the extended sections can be held in the tapered section by the elasticity of the biasing member, so that the locking state can be maintained.

In the tube joint, the biasing member may be integrated with the ring section and extended toward an inner part of the body proper. With this structure, number of the parts of the tube joint can be reduced, so that manufacturing cost of the tube joint can be reduced.

In the tube joint, the claw sections are formed like saw-teeth. With this structure, the claw sections can effectively bite the outer circumferential face of the tube and can effectively lock the tube. When the tube is detached from the tube joint, In the tube joint, trough portions between saw-teeth of the claw section may made shallow toward a tip portion of the claw section. With this structure, the claw sections can effectively bite the outer circumferential face of the tube. On the other hand, since a base portion of each saw-tooth of the claw section is thicker, the base portion bites a little so that the tube can be easily released from the base portions.

In the tube joint, at least a tip portion of each claw section may be made of a metal. With this structure, the hard tip portions of the claw sections can effectively bite the outer circumferential face of the tube.

In the tube joint, a packing, which is capable of tightly fitting the tube, may be provided between the tapered section and the one open end so as to prevent fluid leakage from a gap between the inner circumferential face of the body proper and the tube. With this structure, the fluid leakage can be securely prevented by the simple constitution.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

First Embodiment

Figure 1:
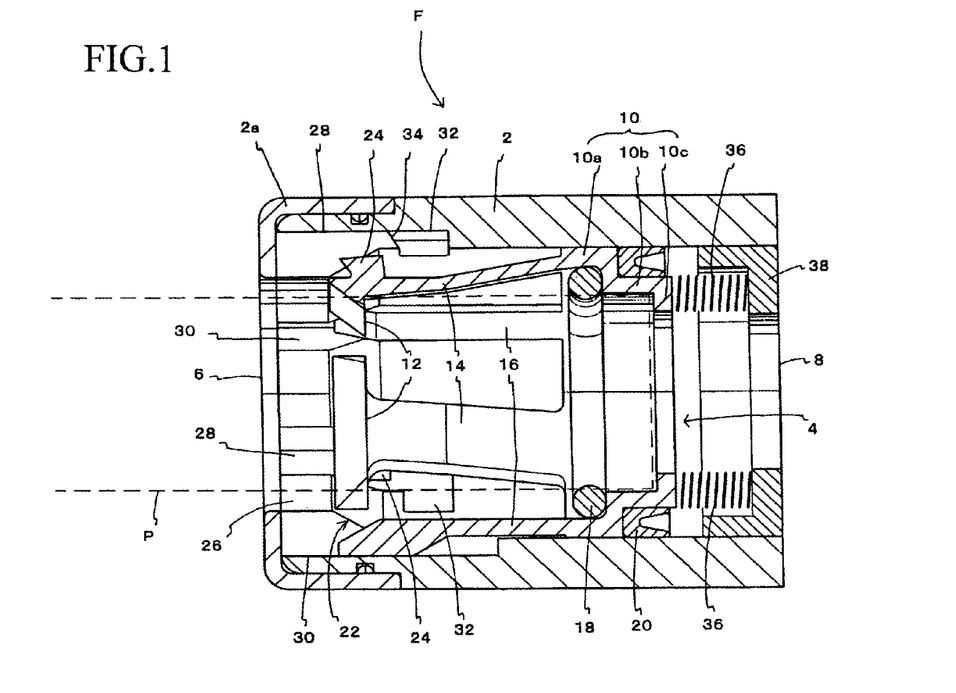
FIG. 1 is a longitudinal sectional view of the tube joint of a first embodiment of the present invention, in which the tube joint is in an initial state.
Figure 2:
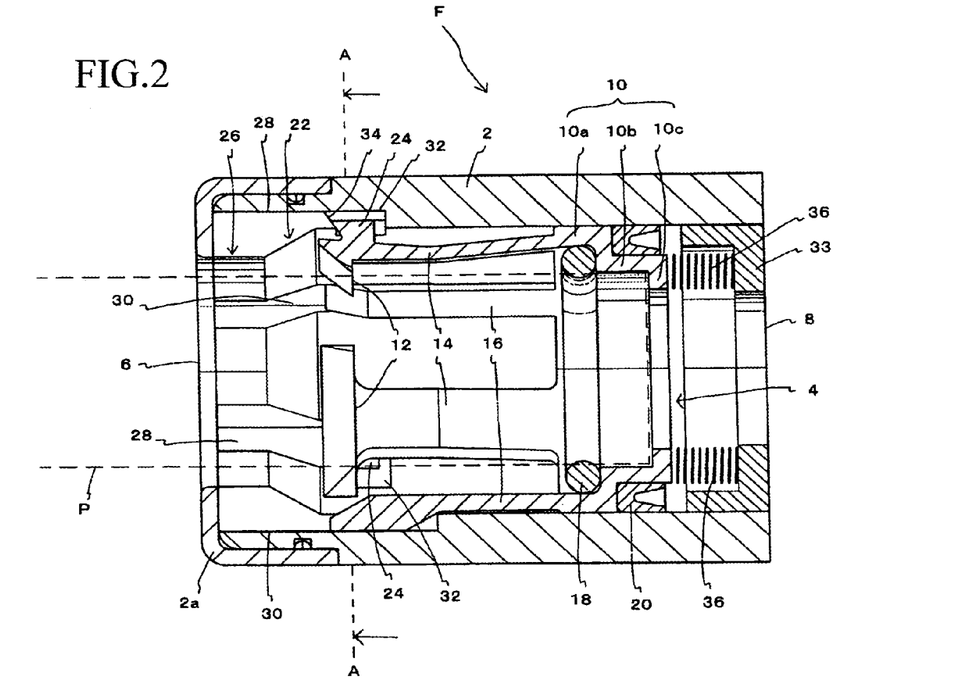
FIG. 2 is a longitudinal sectional view of the tube joint of the first embodiment, in which the tube joint is in operation.
Figure 3:
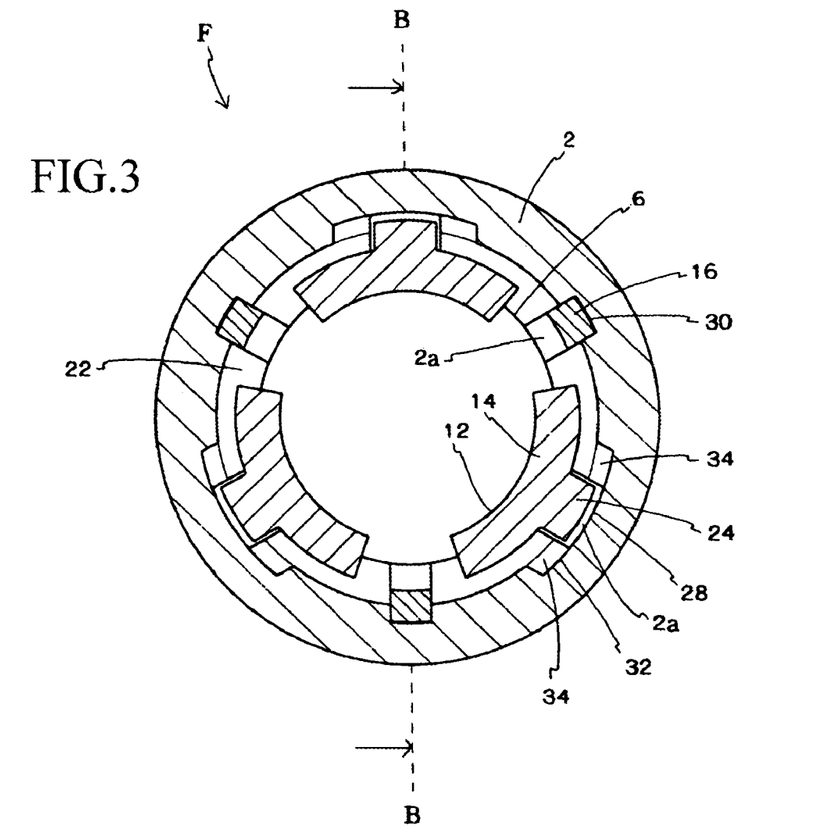
FIG. 3 is a transverse sectional view of the tube joint of the first embodiment, in which the tube joint is in operation.
Figure 4:
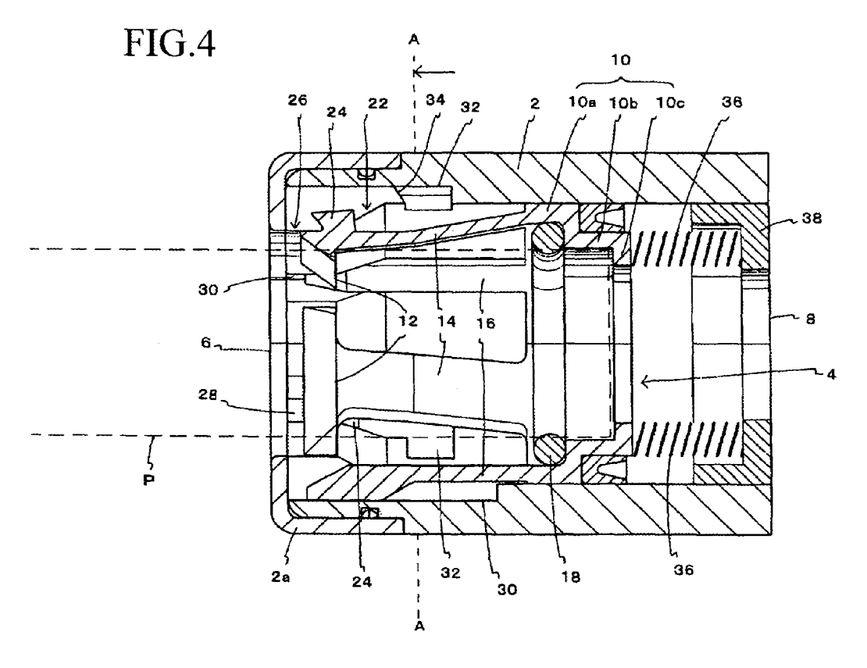
FIG. 4 is a longitudinal sectional view of the tube joint of the first embodiment, in which the tube joint is in a locking state.
Figure 5:
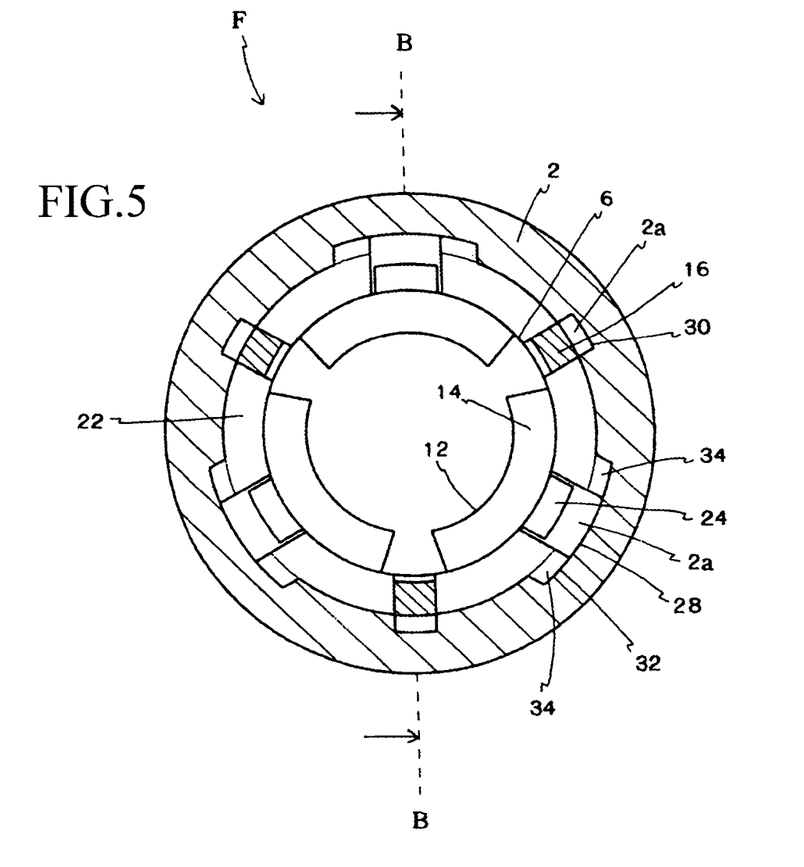
FIG. 5 is a transverse sectional view of the tube joint of the first embodiment, in which the tube joint is in the locking state.

A tube joint of a first embodiment is shown in sectional views of FIGS. 1–5. FIGS. 1, 2 and 4 are longitudinal sectional view of the tube joint F; FIGS. 3 and 5 are transverse sectional views taken along lines A—A shown in FIGS. 2 and 4 and seen from directions of arrows. FIGS. 2 and 4 are the longitudinal sectional views taken along lines B—B shown in FIGS. 3 and 5 and seen from directions of arrows.

As shown in FIG. 1, the tube joint F has a body proper 2, which is formed into a cylindrical shape and has one open end 6. A plastic tube P will be inserted into the tube joint F from the open end 6. The other end 8 of the body proper 2 is connected to a joint hole of a fluidic device (not shown).

Further, the tube joint F has a locking member 4, which is assembled in the body proper 2. The locking member 4 is coaxially arranged with the body proper 2, and its outer circumferential face slidably contacts an inner circumferential face of the body proper 2. A ring section 10 is provided in the body proper 2 and capable of moving in an axial direction of the body proper 2. A plurality of extended sections 14 are extended from the ring section 10 toward the open end 6. A plurality of claw sections 12 are respectively formed at front ends of the extended sections 14. Each claw section is radially projected inward from the front end of each extended section 14. A plurality of arm sections 16 are also extended in the axial direction of the body proper 2 from the ring section 10 toward the open end 6.

The extended sections 14 are made of a flexible material, e.g., plastic.

In the present embodiment, as shown in FIG. 3, three extended sections 14 are arranged in a circumferential direction of the ring section 10 with angular separations of 120 degrees. Three arm sections 16 are also arranged in the circumferential direction of the ring section 10 with angular separations of 120 degrees. The extended sections 14 and the arm sections 16 are alternately arranged with angular separations of 60 degrees.

As shown in FIG. 1, the ring section 10 has: a large diameter part 10a, which is formed on the open end 6 side and whose diameter is larger than an outer diameter of the tube P; a small diameter part 10c, which is formed on the other end 8 side and whose diameter is smaller than the outer diameter of the tube P; and a medium diameter part 10b, whose diameter is nearly equal to the outer diameter of the tube P.

An O-ring packing 18 is provided on an inner circumferential face of the large diameter part 10a and engaged with a bump portion between the large diameter part 10a and the medium diameter part 10b. The O-ring packing 18 prevents fluid leakage.

A Y-ring packing 20 is provided on an outer circumferential face of the medium diameter part 10b. The Y-ring packing 20 also prevents fluid leakage.

Figure 6:
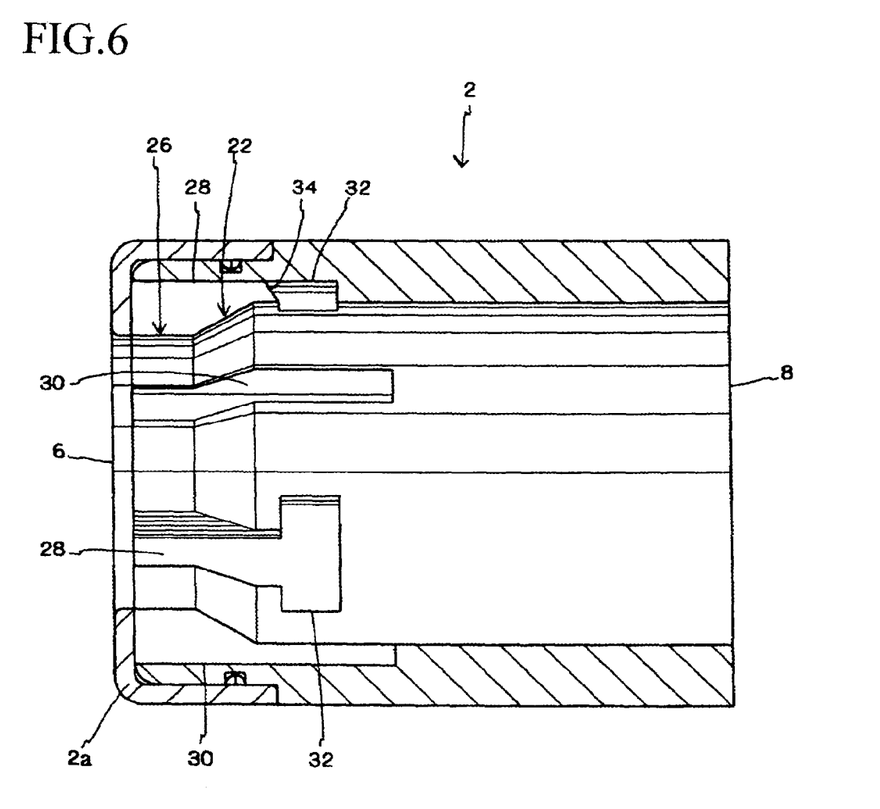
FIG. 6 is a longitudinal sectional view of a body proper of the tube joint of the first embodiment.

FIG. 6 is the longitudinal sectional view of the body proper 2, form which the locking member 4 has been removed.

The body proper 2 includes a cap member 2a, which has a through-hole constituting the open end 6.

A tapered section 22, whose inner diameter is gradually reduced toward the open end 6, is formed in the body proper 2. As shown in FIGS. 4 and 5, the front ends of the extended sections 14 enter the tapered section 22 when the locking member 4 is moved toward the open end 6, so that the extended sections 14 are radially deformed inward. Therefore, a diameter of the front ends of the extended sections 14 is reduced. Note that, sections of mid parts of the extended sections 14 are omitted in FIG. 5.

As shown in FIG. 6, an inner diameter of an inner wall 26, which is formed between the tapered section 22 and the open end 6, and an inner diameter of the through-hole of the cap member 2a constituting the open end 6 are nearly equal to the minimum diameter of the tapered section 22.

As shown in FIG. 1, second groove sections 30 are formed in the inner circumferential face of the body proper 2 including the tapered section 22. The front ends of the arm sections 16 are respectively fitted with the second groove sections 30. With this structure, the front ends of the arm sections 16 are prohibited to turn in the circumferential direction of the body proper 2, but allowed to move in the axial direction thereof.

As shown in FIGS. 4 and 5, the front ends of the arm sections 16 smoothly move in the second groove sections 30 when the locking member 4 is moved toward the open end 6, so that the movement of the locking member 4 in the axial direction of the body proper 2 is not prevented.

Note that, ends of the second groove sections 30 located on the open end 6 side are closed by the cap member 2a.

Projected sections 24 are respectively formed at front ends of the extended sections 14. The projected sections 24 are projected toward the inner circumferential face of the body proper 2. Namely, the projected sections 24 are projected in the opposite directions of the claw sections 12.

First groove sections 28 are formed in the inner circumferential face of the body proper 2 and extended in the axial direction thereof The first groove sections 28 are extended from positions on the inner side of the tapered section 22 to the open end 6 via the tapered section 22. The projected sections 24 can enter the first groove sections 28 so as to allow the extended sections 14 to enter the tapered section 22.

As shown in FIGS. 4 and 5, the projections 24 enter the first groove sections 28 when the locking member 4 is moved toward the open end 6, so that the front ends of the extended sections 14 can smoothly enter the tapered section 22.

Note that, ends of the first groove sections 28 located on the open end 6 side are also closed by the cap member 2a.

As shown in FIG. 6, concave sections 32, which are respectively communicate with the first groove sections 28, are formed in the inner circumferential face of the body proper 2. The concave sections 32 are located on the inner side of the tapered section 22. The concave sections 32 are extended in the circumferential direction of the body proper 2, so that each concave section 32 and each first groove section 28 are formed into a T-shape.

In the present embodiment, a plurality of the concave sections 32 are formed with separations, but one circular concave section 32 may be completely formed in the inner circumferential face of the body proper 2. Further, a part of the inner circumferential face on the other end 8 side of the first groove sections 28 may be formed as the concave section 32. In this case, an inner diameter of the part is larger than the maximum diameter of the tapered section 22.

In FIGS. 2 and 3, the front ends of the extended sections 14 are located on the inner side of the tapered section 22. When an external force is applied to turn the front ends of the extended sections 14 in the circumferential face of the body proper 2, the projected sections 24 respectively move in and along the concave sections 32, so that the front ends can be turned (see FIG. 7). Since the locking member 4 is made of a elastic and flexible material, e.g., plastic, the locking member 4 is deformed or twisted so that the front ends of the extended sections 14 can be turned. Note that, the arm sections 16 are respectively fitted in the second groove sections 30, so the locking member 4 is not entirely turned. Further, even if another external force is applied to move the extended sections 14 toward the open end 6, the projected sections 24 are respectively engaged with edges of the concave sections 32, which are located on the open end 6 side. With this structure, the extended sections 14 are not moved toward the open end 6.

When the external force releases the front ends of the extended sections 14, the extended sections 14 elastically returned to initial positions shown in FIGS. 2 and 3. At the initial positions, the projected sections 24 are respectively located on imaginary lines extended from the first groove sections 28.

Contact faces 34 of the concave sections 32, each of which is formed in the edge located on the open end 6 side, respectively contact the projected sections 24. Each contact face 34 is a slope face, in which a distance from the one open end 6 is gradually made shorter toward an inner bottom of each concave section 32.

As shown in FIG. 1, a plurality of coil springs 36 are provided in the body proper 2 and on the inner side of the locking member 4. The coil springs 36 always bias the locking member 4 toward the open end 6. One end of each coil spring 36 is fixed to a ring-shaped holder 38; the other end of each coil spring 36 is fixed to the small diameter part 10c of the ring section 10 of the locking member 4.

Figure 8A:
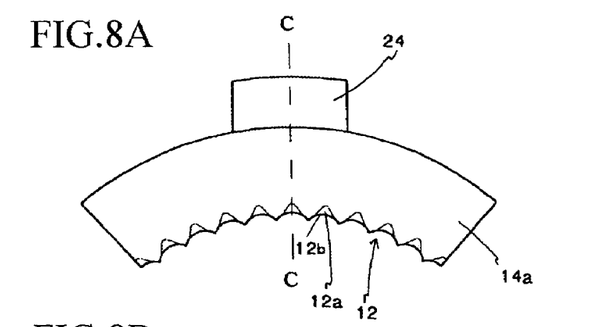
FIG. 8A is a plan view of a claw section seen from an open end of the body proper.
Figure 8B:
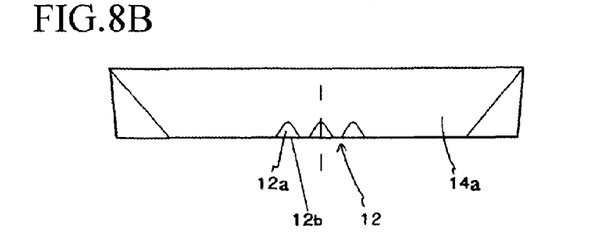
FIG. 8B is a front view of the claw section.

Next, the front ends of the extended sections 14 and the claw sections 12 will be explained with reference to FIGS. 8A–8C. FIG. 8A is a plan view of the front end of the extended section 14 including the claw section 12 seen from the open end 6 of the body proper 2; FIG. 8B is a front view thereof; and FIG. 8C is a sectional view taken along a line C—C shown in FIG. 8A.

Figure 8C:
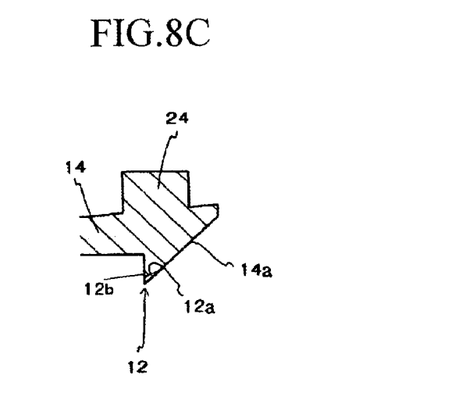
FIG. 8C is a sectional view taken along a line C—C shown in FIG. 8A.

As shown in FIG. 8C, the front end of the extended section 14 has a slope face 14a, in which a distance from the axial line of the body proper 2 is gradually made shorter toward the inner part of the body proper 2.

The claw section 12 is formed like zigzag saw-teeth. The claw section 12 has trough portions 12a, made shallow toward tip portions 12b (see FIG. 8C).

Figure 9:
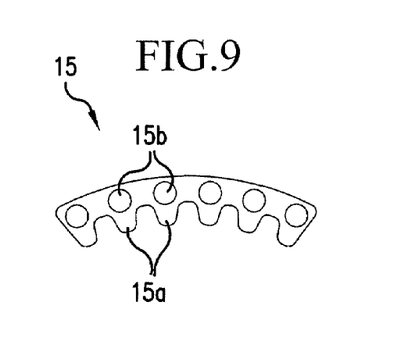
FIG. 9 is a front view of a metallic claw, which is integrated with a front end of a flexible extended section.

As described above, the locking member 4 including the claw sections 12 is made of the flexible material, e.g., plastic. To increase strength of the claw sections 12 and effectively bite the tube P, a metallic claw 15 (see FIG. 9) may be provided to the claw section 12. In this case, the metallic claw 15 is integrated with the claw section 12, and tip portions 15a are outwardly projected from a front edge of the claw section 12. The metallic claw 15 has through-holes 15b. By forming the through-holes 15b, the metallic claw 15 can be insert-molded in and integrated with the plastic claw section 12.

Successively, a method of attaching the tube P to the tube joint F and action of the tube joint F will be explained.

Before attaching the tube P, the locking member 4 is biased toward the open end 6 by the coil springs 36, so the front ends of the extended sections 14 enter the tapered section 22. Therefore, the diameter of the front ends is slightly reduced (see FIG. 1). In this state, the elastic restitutive forces of the extended sections 14 push the tapered face of the tapered section 22; on the other hand, counter forces, which push the front ends of the extended sections 14 toward the inner part of the body proper 2, work to the front ends of the extended sections 14. Therefore, the locking member 4 is stopped at a position, at which the elastic forces of the coil springs 36 and the restitutive forces of the deformed extended sections 14 are balanced. Namely, the elastic forces of the coil springs 36 are designed to stay the front ends of the extended sections 14 in the tapered section 22 in the initial state.

The initial state is shown in FIG. 1. To attach the tube P to the tube joint F, the tube P is manually inserted into the open end 6. An end of the tube P contacts the slope faces 14a of the front ends of the extended sections 14. By further inserting the tube P, the tube P radially moves the extended sections 14 outward and enters the O-ring packing 18 and the medium diameter part 10b. The tube P reaches a bump portion of the small diameter part 10c. Further, the tube P is pushed inward against the elasticity of the coil springs 36, then the locking member 4 is moved toward the inner part of the body proper 2. By moving the locking member 4 inward, the front ends of the locking member 4 are located on the inner side of the tapered section 22 and released from the tapered section 22. This state is shown in FIG. 2. As shown in FIG. 2, the arm sections 16 contact inner edges of the first groove sections 28; the projected sections 24 contact inner edges of the concave sections 32. Therefore, the locking member 4 is not further moved inward. In this state, the claw sections 12 lightly contact the outer circumferential face of the tube P.

Next, the tube P is pulled outward. The saw-teeth of the claw sections 12 slightly bite the outer circumferential face of the tube P, so that the locking member 4 is moved toward the open end 6 together with the tube P. The front ends of the extended sections 14 enter the tapered section 22, and the extended sections 14 are radially deformed inward so that the diameter of the front ends is reduced. By reducing the diameter, the claw sections tightly bite the outer circumferential face of the tube P. At that time, the projected sections 24 of the extended sections 14 enter the first groove sections 28, so that they are not interfered.

By further pulling the tube P outward, the front ends of the extended sections 14 reach the inner wall part 26 (see FIGS. 4 and 5). In this state, the claw sections 12 tightly bite the outer circumferential face of the tube P, and the tube P is securely held. Namely, the tube P can be securely locked in the body proper 2. An inner diameter of the inner wall part 26, which is formed between the tapered section 22 and the open end 6, is nearly equal to the minimum diameter of the tapered section 22. Therefore, the front ends of the extended sections 14 are not located on the inner tapered face of the tapered section 22, so that the front ends of the extended sections 14 (the locking member 4) never moves inward along the inner tapered face of the tapered section 22. Namely, the tube P is not naturally unlocked.

In this state too, the coil springs 36 bias the locking member 4 toward the open end 6, so the extended sections 14 of the locking member 4 never return into the tapered section 22. The secure lock of the tube P can be maintained.

By using the tube joint F of the present embodiment, a worker can easily attach and lock the tube P, with one hand, by inserting the tube P into the open end 6 and pulling the tube P in the opposite direction.

Note that, the gap between the outer circumferential face of the ring section 10 and the inner circumferential face of the body proper 2 is sealed by the Y-ring packing 20, so that a fluid in the body proper 2 never leaks from the gap.

Further, the gap between the outer circumferential face of the tube P and the ring section 10 is sealed by the O-ring packing 18, so that a fluid in the ring section 10 never leaks from the gap.

Next, a method of detaching the tube P from the tube joint F and action of the tube joint F will be explained.

When the tube P is detached from the tube joint F in the state shown in FIGS. 4 and 5, firstly the tube P is pushed inward. Then, the locking member 4 is pushed inward, so that the extended sections 14, which have been radially inwardly deformed by the tapered section 22, is released from the tapered section 22 and the diameter is increased. Therefore, the bite of the claw sections 22 is loosened.

In this state, the tube P is slightly turned about the axial line of the tube P. The claw sections 12 have slightly bit the tube P. Further, the claw sections 12 is formed like the saw-teeth, so frictional coefficient in the circumferential direction is great. Therefore, by turning the tube P, the locking member 4 is elastically twisted, and the claw sections 12 of the extended sections 14 are turned in the circumferential direction of the body proper 2 (see FIG. 7), by a frictional force between the tube P and the claw sections 12, together with the tube P.

Figure 7:
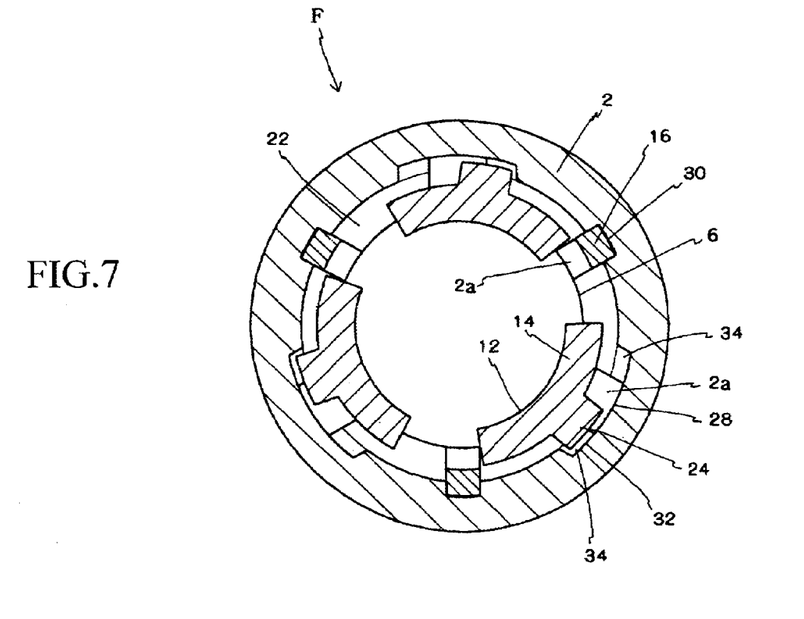
FIG. 7 is a transverse sectional view of the tube joint of the first embodiment, in which the tube joint is operated to detach a tube.

When the tube P is pulled outward, the locking member 4 is pulled toward the open end 6 together with the tube P, but the projected sections 24 engage with the contact faces 34 of the concave sections 32, which are located on the open end 6 side, so that the movement of the locking member 4 toward the open end 6 is prohibited. Therefore, only the tube P can be pulled out from the tube joint F.

Upon detaching the tube P, the twist of the locking member 4, which has been twisted by turning the tube P, is released and the front ends of the extended sections 14 elastically return to the initial positions (see FIG. 3). Therefore, the projected sections 24 are disengaged from the contact faces 34, and the locking member 4 is returned to the position shown in FIG. 1 by the elasticity of the coil springs 36.

By using the tube joint F of the present embodiment, the worker can easily detach the tube P from the tube joint F by pushing the tube P inward, turning the tube P slightly, and pulling the tube P outward.

Unlike the conventional tube joints which must be handled with both hands, the tube P can be easily attached and detached with one hand. Therefore, even if the tube joints F are concentrated in a small area and provided in a place where it is difficult to see and deal, the tube or tubes P can be easily attached and detached.

As shown in FIG. 2, Each contact face 34, which contacts the projected section 24, is the slope face, in which the distance from the one open end 6 is gradually made shorter toward the inner bottom of each concave section 32. When the projected section 24 contacts the contact face 34 with the movement of the tube P, a force heading for the inner bottom of the concave section 32 works to the slope contact face 34, so that the diameter of the extended sections 14 is increased. Therefore, the claw sections 12 are separated from the tube P, and the tube P can be easily pulled out.

As shown in FIG. 8C, trough portions 12a of the claw section 12 are made shallow toward the tip portion 12b. With this structure, thin edges of the trough portion 12a can effectively bite the outer circumferential face of the tube P. On the other hand, since the base portion of the saw-tooth of the claw section 12 is thicker, the base portion bites the tube P a little, so that the claw section 12 can easily release the tube P when the tube P is detached from the tube joint F.

Second Embodiment

Figure 10:
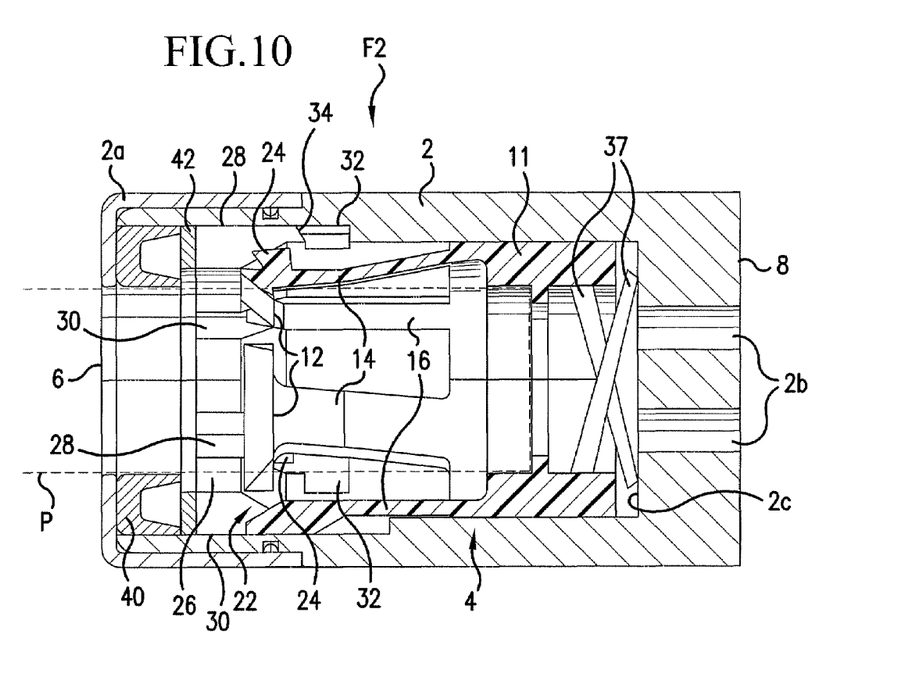
FIG. 10 is a longitudinal sectional view of the tube joint of a second embodiment of the present invention.

A second embodiment will be explained with reference to FIG. 10. FIG. 10 is a sectional view of a tube joint F2 of the second embodiment. FIG. 10 shows a section of the tube joint F taken along an axial line of the tube joint F2.

Note that, structural elements explained in the first embodiment are assigned the same symbols and explanation will be omitted.

Unique features of the tube joint F2 are a Y-ring packing 40, which is employed instead of the packing 18 and 20 of the tube joint F, and leaf springs 37, which are employed instead of the coil springs 36 of the tube joint F.

In the tube joint F2, the packing (the Y-ring packing 40) is provided to a part of the inner circumferential face between the inner wall part 26 and the open end 6. The Y-ring packing 40 is sandwiched between a ring-shaped member 42, which is located on the open end 6 side of the inner wall part 26, and an end of the cap member 2a.

The Y-ring packing 40 prevents fluid leakage from a gap between the tube P and the tube joint F2. By employing only one Y-ring packing 40, two pieces of the packing 18 and 20 of the first embodiment can be omitted. Therefore, number of parts of the tube joint F2 can be reduced. Further, the ring section 10 of the first embodiment has the three parts 10a, 10b and 10c having different diameters, but the ring section 11 of the present embodiment has no parts having different diameters. Therefore, the structure of the tube joint F2 can be more simple.

The tube joint F2 has the leaf springs 37, which are integrated with the locking member 4 (the ring section 11). The leaf springs 37 are extended from the ring section 11 toward the other end 8, and their ends contact a wall section 2c, which closes the other end 8, so as to bias the locking member 4 toward the open end 6.

The leaf springs 37 are integrated with the locking member 4 made of the flexible material, e.g., plastic.

A plurality of through-holes 2b, through which the fluid passes, are formed in the wall section 2c, which holds the leaf springs 37. With this structure, the leaf springs 37 can be elastically deformed with the movement of the locking member 4. Even if ends of the leaf springs 37 slide on the wall section 2c, the leaf springs 37 never closes a fluid pass in the tube joint F2.

Since the leaf springs 37 integrated with the locking member are employed instead of the coil springs 36 of the first embodiment, number of parts of the tube joint F2 can be reduced and the structure of the tube joint F2 can be more simple.

Note that, the leaf springs 37 may be spiraled in the circumferential direction of the body proper 2, and the ends of the leaf springs 37 may slide along an edge of the wall section 2c. In this case, only one through-hole 2b may be formed at center as well as the ring-shaped holder 38 of the tube joint F.

In the above described embodiments, the tube joints F and F2 will be attached to the fluidic devices, but the tube joint of the present invention can be applied to many fields.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tube joint comprising:
   a body proper being formed into a cylindrical shape, said body proper having an axially outer open end, through which a tube is inserted; and
   a locking member being provided in said body proper, said locking member locking the tube in said body proper, wherein said locking member includes:
      a ring section having an outer circumferential part sliding on an inner circumferential face of said body proper and being capable of moving in an axial direction of said body proper;
      a plurality of flexible extended sections extending axially outwardly from the ring section toward the one open end of said body proper; and
      a plurality of claw sections being respectively formed at axially outer front ends of the flexible extended sections and radially projected inward therefrom, and wherein
   said body proper has a tapered section, whose inner diameter is gradually reduced in the axially outer direction toward the open end and which reduces a diameter of the front ends of the flexible extended sections when said locking member is moved axially outwardly toward the open end and the front ends of the flexible extended sections enter the tapered section, whereby the claw sections bite and lock the tube, the front ends of the flexible extended sections, when located at an axially inner side of the body proper with respect to the tapered section, move in a circumferential direction about the axis of the body proper due to a frictional force between the tube and the claw sections when the tube is turned about its axis by an external force, and return to initial positions due to elasticity of said locking member when the external force is removed, and an engaging mechanism allows the front ends of the flexible extended sections to enter the tapered section when the front ends are located at the initial positions, and engages with the front ends to prevent their entry into the tapered section when the front ends are moved in the circumferential direction of the body proper by the frictional force.

2. The tube joint according to claim 1, wherein an inner diameter of the open end of said body proper is equal to the minimum inner diameter of the tapered section.

3. The tube joint according to claim 1, wherein said engaging mechanism includes:

a plurality of projected sections being respectively projected from the flexible extended sections toward the inner circumferential face of the body proper;

a plurality of first groove sections being formed in the inner circumferential face of the body proper and extended in the the axial direction of the body proper, the first groove sections allow the front ends to enter the tapered section without interference with the projected sections when the front ends are located at their initial positions; and a concave section being formed in the inner circumferential face of the body proper, being extended in the circumferential direction thereof, communicating with the first groove sections, and allowing the front ends to move in the circumferential direction of the body proper by said frictional force without interference with the projected sections, and the projected sections engage with an edge of the concave section, so as to prevent the front ends from entering the tapered section when the front ends are moved in the circumferential direction.

4. The tube joint according to claim 3, wherein a contact face of the edge of the concave section, which contacts the projected sections, is a slope face, in which a distance from the one open end is gradually made shorter toward an inner bottom of the concave section.

5. The tube joint according to claim 1, wherein said locking member has a plurality of arm sections extended from the ring section in the axial direction of said body proper, a plurality of second groove sections are formed in the inner circumferential face of the body proper, and front ends of the arm sections are respectively fitted in the second groove sections so that the front ends of the arm sections are prevented from moving in the circumferential direction of the body proper but are allowed to move in the axial direction thereof.

6. The tube joint according to claim 1, further comprising a biasing member biasing said locking member toward the open end.

7. The tube joint according to claim 6, wherein the biasing member is integrated with the ring section and extended toward an inner part of said body proper.

8. The tube joint according to claim 1, wherein the claw sections are formed like saw-teeth.

9. The tube joint according to claim 8, wherein a trough portion between each saw-tooth of the claw section is made shallow toward a tip portion of the claw section.

10. The tube joint according to claim 1, wherein at least a tip portion of each claw section is made of a metal.

11. The tube joint according to claim 1, wherein a packing, which is capable of tightly fitting the tube, is provided between the tapered section and the open end so as to prevent fluid leakage from a gap between the inner circumferential face of said body proper and the tube.

* * * * *